Nov. 27, 1956  E. H. SPECK  2,771,901
NON-RETURN VALVES
Filed April 13, 1953  2 Sheets-Sheet 1
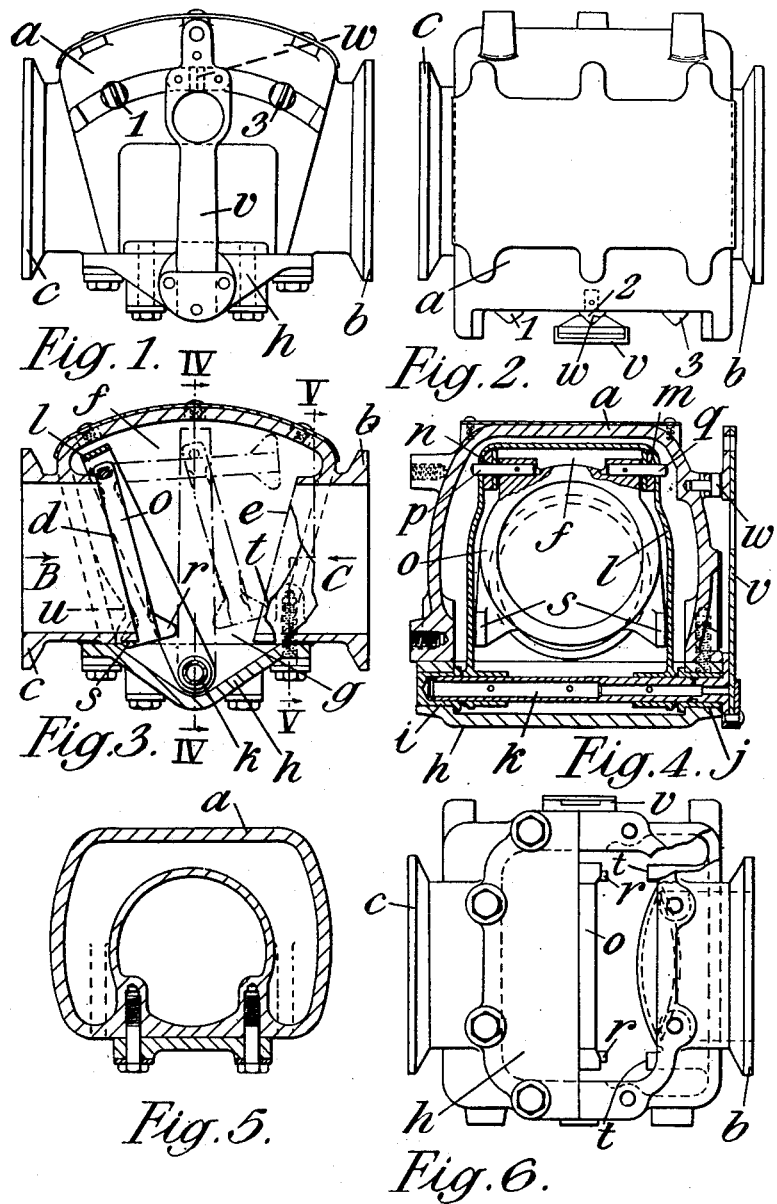
Inventor
E. H. Speck Nov. 27, 1956  E. H. SPECK  2,771,901
NON-RETURN VALVES
Filed April 13, 1953  2 Sheets-Sheet 2
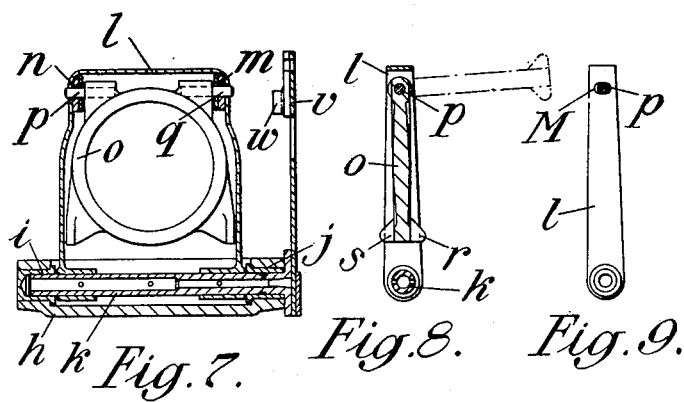
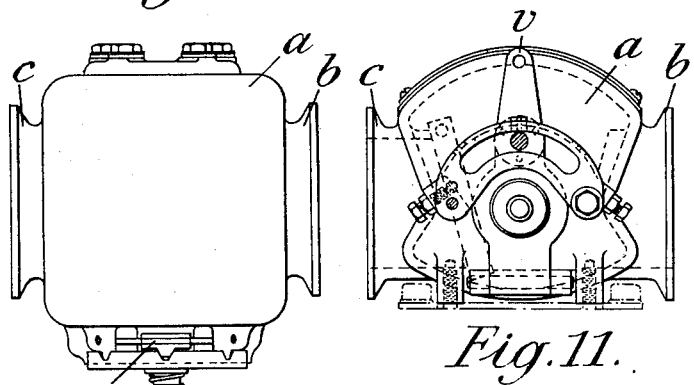
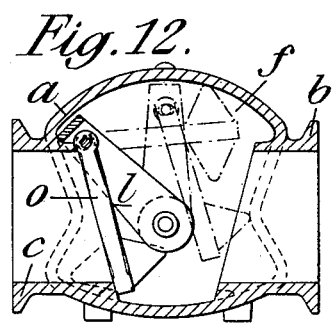
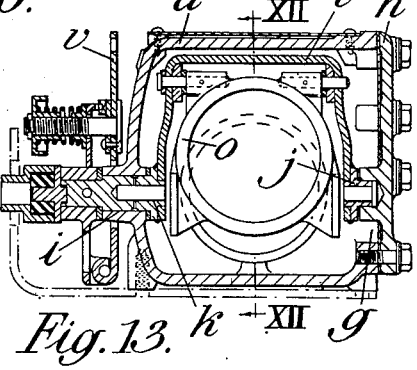
Inventor
E. H. Speck

United States Patent Office 2,771,901
Patented Nov. 27, 1956

2,771,901

NON-RETURN VALVES

Eric Hardy Speck, Yeovil, England, assignor to Normalair Limited, Yeovil, England Application April 13, 1953, Serial No. 348,303

5 Claims. (Cl. 137—269.5)

This invention relates to reversible non-return valves and particularly, though not exclusively, for use with high pressures and high temperatures and has for its object to provide forms of such valves in which it is virtually impossible for jamming or sticking to occur between the valve proper and its associated seatings or for damage of the valve or seating to occur and which permit of substantially free flow of fluid in one direction and no flow in the other but which can be set readily so as to prevent free flow in the first-mentioned direction whilst permitting free flow in the opposite direction.

The invention consists in a reversible flap valve having features as set forth in the claims appended hereto.

Referring to the accompanying diagrammatic drawings:

Figure 1 is a side view of one convenient construction of non-return valve embodying the present invention.

Figure 2 is a plan view thereof.

Figure 3 is a vertical longitudinal sectional view thereof.

Figure 4 is a cross-sectional view on the line IV/IV of Figure 3.

Figure 5 is a cross-sectional view on the line V/V of Figure 3.

Figure 6 is an inverted plan view with one half cover removed.

Figure 7 is a cross-sectional view of a detail.

Figure 8 is a longitudinal section of a detail.

Figure 9 is a side view of the detail of Figure 8.

Figure 10 is a plan view of a modified construction.

Figure 11 is a side view thereof.

Figure 12 is a vertical longitudinal sectional view on the line XII/XII of Figure 13.

Figure 13 is a cross-sectional view on the line XIV/XIV of Figure 12.

In carrying the invention into effect according to one convenient form illustrated by way of example in Figures 1 to 9, an approximately cylindrical cast casing *a* is provided furnished at each end with flanges *b* and *c*, either V shaped for clamp attachment as shown or plain flanges for bolting, and furnished with two opposed valve seatings *d* and *e*, preferably at an angle of approximately 15°, an internal recess *f* and an opening *g* on the opposite side over which is bolted a dished detachable cover plate *h*.

The plate *h* is furnished with glanded bearings *i*, *j* supporting an operating shaft *k* to which is attached, by means such as splines or rivets, a frame *l* having at its other end bearings *m* and *n* supporting a flap member *o* which is free to swing through the frame on pivot pins *p* and *q*. The flap member *o* has two protrusions *r* and *s* which when the valve is in neutral position and the flap is free to swing, will strike against cam-shaped stops *t* and *u* and prevent the flap from damaging the seatings *d* or *e*. The protuberances *r*, *s* also serve to limit the travel in the horizontal direction when the valve is set to operate as a non-return valve in either direction.

An external operating lever *v* furnished with a V shaped depression *w* for engaging any one of three wedge-shaped stops 1, 2, 3 on the casing *a* is mounted rigidly on the operating shaft *k*.

Alternatively the operating lever *v* may be furnished with locating means comprising a retractable plunger engaging in sockets in the casing *a*.

In operation, when the operating lever *v* is in a vertical position and its locating depression *w* engages the corresponding stop 2, the flap assembly *l* and *d* is held vertical as indicated in dotted lines in Figure 3 and so allows fluid or liquid to flow freely in either direction past the flap. When the lever *v* is set to engage the side stop 1 as shown in full lines in Figure 3, the flap member *o* lies flat on the valve seating *d* and is free to swing away from that seating on flow taking place in the direction away from the seating as shown by arrow B in Figure 3, thus forming a non-return valve for flows in this direction.

Similarly, if the lever *v* is set to engage the side stop 3, the flap member *o* will lie on the other seating *e* and is free to swing away therefrom on flow taking place in a direction C away from that seating, thus forming a non-return valve for flows in this opposite direction C.

The flap member *o* cannot chafe or hammer either of its seating surfaces *d*, *e*. When the lever *v* is moved away from positions 1 or 2, the valve *o* is raised off the respective seating by means of the protuberance *s* or *x* before being transferred and thereby possible damage of the seating is prevented.

In order to allow the flap member *o* to rest freely on either of the seatings *d* or *e* the frame bearings *m* and *n* are elongated as indicated at M in Figure 9, and, as previously stated, the seatings *d* and *e* are at an angle of approximately 15° so as to ensure that the flap member *o* will shut by gravity; if desired a spring may be introduced to assist the closing of the flap member.

In carrying the invention into effect according to a slightly modified arrangement illustrated in Figures 10 to 13, the valve is similar in most respects to that described above except that the opening *g* and cover plate *h* are situated at one side of the casing *a* instead of at the bottom end, the casing has a bearing *i* formed in the side opposite the opening *g* in the cover plate *h* which bearing carries one end of the operating shaft *k*. The other end of the shaft is supported in a bearing *j* formed in the detachable cover *h* and the operating shaft *k* and frame *l* are formed in one unit.

Valves embodying the present invention have a wide application for use and can conveniently be used for ground testing of pressurised aircraft or for duct testing.

I claim:

1. A reversible flap valve comprising a casing, two opposed valve seatings in said casing, a valve member between said seatings, a rocking supporting member encircling said valve member means for retaining said supporting member in a central position or into a position at either side of said position, said supporting member being so pivoted on said casing as to restrict said valve member to movements in a plane at right angles to the planes containing said seatings and means operable from the exterior of said casing for rocking said supporting member into any of said positions, a protuberance on both sides of said valve member adapted to coact with cam members adjacent to both seatings whereby before the valve member is transferred from one side to the other the valve member is raised off its seating and the valve member is prevented from striking and damaging itself or the seatings when the valve member is positioned in central position.

2. A flap valve as claimed in claim 1 wherein said valve member is pivoted on a frame constituting said supporting member.

3. A flap valve as claimed in claim 1 wherein said casing is furnished on one side with an aperture closed by a detachable plate.

4. A flap valve as claimed in claim 1 wherein said casing is furnished with at least one internal cavity for accommodating the valve member when in open position.

5. A flap valve as claimed in claim 1 incorporating a lever rigid with said supporting member co-operating with three notches on said casing.

References Cited in the file of this patent
UNITED STATES PATENTS

| | | |
|---|---|---|
| 793,577 | Frank | June 27, 1905 |
| 1,020,022 | Burke | Mar. 12, 1912 |
| 1,821,992 | Stevens | Sept. 8, 1921 |